US012726404B2

(12) United States Patent
Armenta et al.

(10) Patent No.: US 12,726,404 B2
(45) Date of Patent: Sep. 1, 2026

(54) IN SERVICE UPGRADE OF RADIO ACCESS NETWORK RADIO UNIT OF A CELLULAR NETWORK

(71) Applicant: DISH WIRELESS L.L.C., Englewood, CO (US)

(72) Inventors: Julio Armenta, Englewood, CO (US); Gurpreet Sohi, Parker, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 660 days.

(21) Appl. No.: 18/147,427

(22) Filed: Dec. 28, 2022

(65) Prior Publication Data

US 2024/0223448 A1 Jul. 4, 2024

(51) Int. Cl.
*H04L 41/082* (2022.01)
*H04W 24/02* (2009.01)
*H04W 28/02* (2009.01)

(52) U.S. Cl.
CPC .......... *H04L 41/082* (2013.01); *H04W 24/02* (2013.01); *H04W 28/0247* (2013.01)

(58) Field of Classification Search
CPC ... G06F 8/65; G06F 8/61; G06F 8/654; G06F 8/656; H04W 24/02; H04W 8/245; H04W 88/08; H04W 28/0247; H04L 41/082
See application file for complete search history.

(56) References Cited

U.S. PATENT DOCUMENTS 8,204,493 B2 * 6/2012 Okita .................... H04W 24/02 455/418
10,732,961 B1 * 8/2020 Madasamy ............ G06F 8/656
11,249,747 B2 * 2/2022 Sprygada .............. H04L 41/082
2004/0203810 A1 * 10/2004 Virtanen ............... H04W 24/02 455/450
2005/0076333 A1 * 4/2005 Leclair ...................... G06F 8/61 717/176
2007/0218887 A1 * 9/2007 Okita .................... H04W 8/245 455/419

(Continued)

FOREIGN PATENT DOCUMENTS

CN 103946800 A * 7/2014 .......... H04L 45/563
EP 3278215 B1 1/2020

OTHER PUBLICATIONS

Jain et al., "Infield Firmware Update: Challenges and Solutions," *International Conference on Communciation and Signal Processing* (*ICCSP*), Melmaruvathur, India, Apr. 6/8, 2016, pp. 1232-1236.

(Continued)

*Primary Examiner* — Matthew C Sams

(74) *Attorney, Agent, or Firm* — Seed Intellectual Property Law Group LLP

(57) ABSTRACT

Various embodiments of apparatus, systems and/or methods are described for providing an in-service upgrading of software for a radio access network (RAN) radio unit (RU). The method includes directing traffic from user equipment to the first RU and a second RU that both reside on a first sector of a cell site. A software upgrade is received at the first RU, and the amount of traffic at the first RU is drained to the second RU so that the second RU handles the traffic for the first sector. When the traffic has been drained at the first RU, the software upgrade is installed in the first RU, and the first RU is rebooted.

12 Claims, 8 Drawing Sheets

(56) References Cited

U.S. PATENT DOCUMENTS

| | | | | |
|---|---|---|---|---|
| 2008/0076401 | A1* | 3/2008 | Zeilingold | G06F 8/65 455/418 |
| 2011/0070875 | A1* | 3/2011 | Okita | H04W 8/245 455/418 |
| 2013/0171983 | A1* | 7/2013 | Zhang | H04W 52/0206 455/422.1 |
| 2013/0290945 | A1* | 10/2013 | Sawal | H04Q 3/54516 713/100 |
| 2015/0149658 | A1* | 5/2015 | Wei | H04L 45/563 709/242 |
| 2016/0004528 | A1* | 1/2016 | Price | G06F 8/65 717/173 |
| 2016/0364231 | A1* | 12/2016 | Tati | G06F 8/656 |
| 2023/0305831 | A1* | 9/2023 | Yu | H04L 67/56 |
| 2024/0406739 | A1* | 12/2024 | Iwamoto | H04W 24/04 |

OTHER PUBLICATIONS

Communication pursuant to Article 94(3) EPC for EP Application No. 23 847 822.6, dated Jul. 2, 2026, 10 pages.

* cited by examiner

IN SERVICE UPGRADE OF RADIO ACCESS NETWORK RADIO UNIT OF A CELLULAR NETWORK

BACKGROUND

In a cellular radio network, mobile terminals (also known as user equipment (UE)) communicate via a radio access network (RAN) to one or more core networks. The RAN covers a geographical area which is divided into cell areas, with each cell area being served by a radio base station. A cell is a geographical area where radio coverage is provided by the radio base station equipment at a base station site.

Each RAN includes a radio unit (RU) for each antenna. Each RU carries real time user data and converts digital signals to analog/RF signals and vice versa to feed data to/from antennas of the UEs. Each RU is controlled by software, which needs to be periodically updated. During the software upgrade process of the RUs, each RU needs to be rebooted to complete the upgrade and the active sessions/calls have to be terminated. Thus, the software upgrade of RU impacts service and is typically scheduled during the maintenance window.

SUMMARY

Disclosed herein are embodiments of systems and methods to upgrade a RAN RU with low or no impact on service. This is completed by including two RUs per sector at the cell site so that the traffic for a first RU can be drained to a second RU so that while the second RU is handling the traffic in the sector they share, the other RU can be upgraded and rebooted.

Generally, according to some embodiments, various embodiments of apparatus, systems and/or methods are described below.

According to one embodiment, a method is provided for an in-service upgrading of software for a radio access network (RAN) radio unit (RU). The method includes directing traffic from user equipment to the first RU and a second RU that both reside on a first sector of a cell site. A software upgrade is received at the first RU, and the amount of traffic at the first RU is drained to the second RU so that the second RU handles the traffic for the first sector. When the traffic has been drained at the first RU, the software upgrade is installed in the first RU, and the first RU is rebooted According to another embodiment, a cell site includes a plurality of antennas, a plurality of sectors to provide cellular coverage around the cell site; and at least two RUs per sector. Each RU comprises a first memory and a second memory, where the first memory of a first RU is configured to handle traffic in a first sector, and the second memory of the first RU is configured to receive a software upgrade for upgrading the first RU. The amount of traffic at the first RU is drained so that the second RU handles the traffic for the first sector. The software upgrade in the second memory is used to upgrade the software for the first RU while the second RU handles the traffic in the first sector.

According to one embodiment, a method includes an in-service upgrading of software for a radio access network (RAN) radio unit (RU). The method includes: directing traffic from user equipment to the first RU and a second RU that both reside on a first sector of a cell site, wherein the first RU comprises a first memory and a second memory separate from the first memory; receiving a software upgrade at the second memory of the first RU; draining the amount of traffic at the first RU to the second RU so that the second RU handles the traffic for the first sector; when the traffic has been drained at the first RU, installing the software upgrade in the second memory of the first RU; and starting the first RU running the upgraded software off the second memory.

BRIEF DESCRIPTION OF THE DRAWINGS

The same number represents the same element or same type of element in all drawings.

DETAILED DESCRIPTION OF EMBODIMENTS

The various embodiments described herein generally provide apparatus, systems and methods for in service upgrades of a RAN DU and RU.

Establishing a Cellular Network Using Kubernetes Clusters

First, the kubernetes cluster configuration is discussed below.

A kubernetes cluster is a set of nodes that run containerized applications. Containerizing applications is an operating system-level virtualization method used to deploy and run distributed applications without launching an entire virtual machine (VM) for each application.

A cluster configuration software is available at a cluster configuration server. This guides a user, such as system administrator, through a series of software modules for configuring hosts of a cluster by defining features and matching hosts with requirements of features so as to enable usage of the features in the cluster. The software automatically mines available hosts, matches host with features requirements, and selects the hosts based on host-feature compatibility. The selected hosts are configured with appropriate cluster settings defined in a configuration template to be part of the cluster. The resulting cluster configuration provides an optimal cluster of hosts that are all compatible with one another and allows usage of various features. Additional benefits can be realized based on the following detailed description.

The present application uses such kubernetes clusters to deploy a RAN so that the vDU of the RAN is located at one kubernetes cluster and the vCU is located at a remote location from the vDU. This configuration allows for a more stable and flexible configuration for the RAN.

With the above overview in mind, the following description sets forth numerous specific details in order to provide a thorough understanding of the present invention. It will be apparent, however, to one skilled in the art that the present invention may be practiced without some or all of these specific details. Operations may be done in different orders, and in other instances, well known process operations have not been described in detail in order not to unnecessarily obscure the present invention. Several exemplary embodiments of the invention will now be described in detail with reference to the accompanying drawings.

Figure 1:
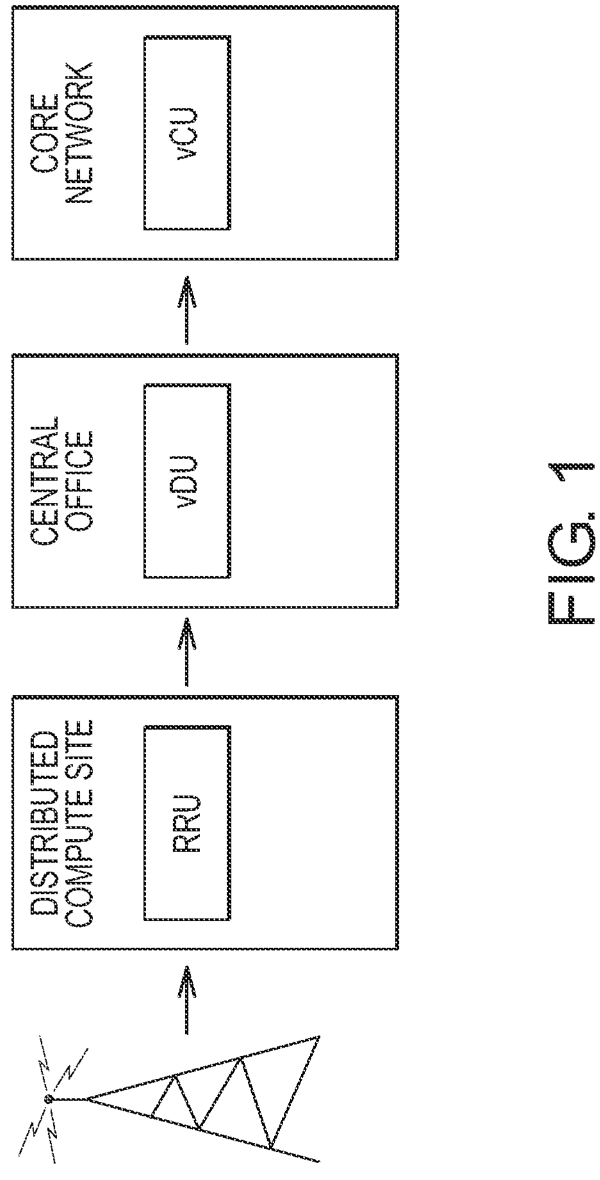
FIG. 1 illustrates an embodiment of a wireless cellular system, according to some embodiments.

The RAN includes a tower, radio unit (RU), distributed unit (DU), central unit (CU), and an element management system (EMS). FIG. 1 illustrates a system that delivers full RAN functionality using network functions virtualization (NFV) infrastructure. This approach decouples baseband functions from the underlying hardware and creates a software fabric. Within the solution architecture, virtualized baseband units (vBBU) process and dynamically allocate resources to remote radio units (RRUs or RUs) based on the current network needs. Baseband functions are split between central units (CUs) and distributed units (DUs) that can be deployed in aggregation centers or in central offices using a distributed architecture, such as using kubernetes clusters as discussed herein.

CUs and DUs (and virtualized CUs and DUs (vCUs and vDUs)) run as virtual network functions (VNFs) within the NFV infrastructure. The entire software stack that is needed is provided for NFV, including open source software. This software stack and distributed architecture increases interoperability, reliability, performance, manageability, and security across the NFV environment.

The RUs are mostly located at the cell sites and receives a digital signal(s) from the DUs which can be localized at the location of the RUs or in a central location. The RUs convert the digital signals to analog signals. The RUs then feed the analog signals into the antennas, which then broadcast these analog signals over the air to provide coverage in a specific area. The RUs operate over specific bands (low bands: 600 Mhz, 700 Mhz, 850 Mhz, mid-bands: 1710 MHz-1780 MHz and 1695 MHz-1710 MHz, etc.).

RAN standards require deterministic, low-latency, and low-jitter signal processing. These are achieved using kubernetes clusters to control each RAN. Moreover, the RAN may support different network topologies, allowing the system to choose the location and connectivity of all network components. Thus, the system allowing various DUs on kubernetes clusters allows the network to pool resources across multiple cell sites, scale capacity based on conditions, and ease support and maintenance requirements.

Figure 2:
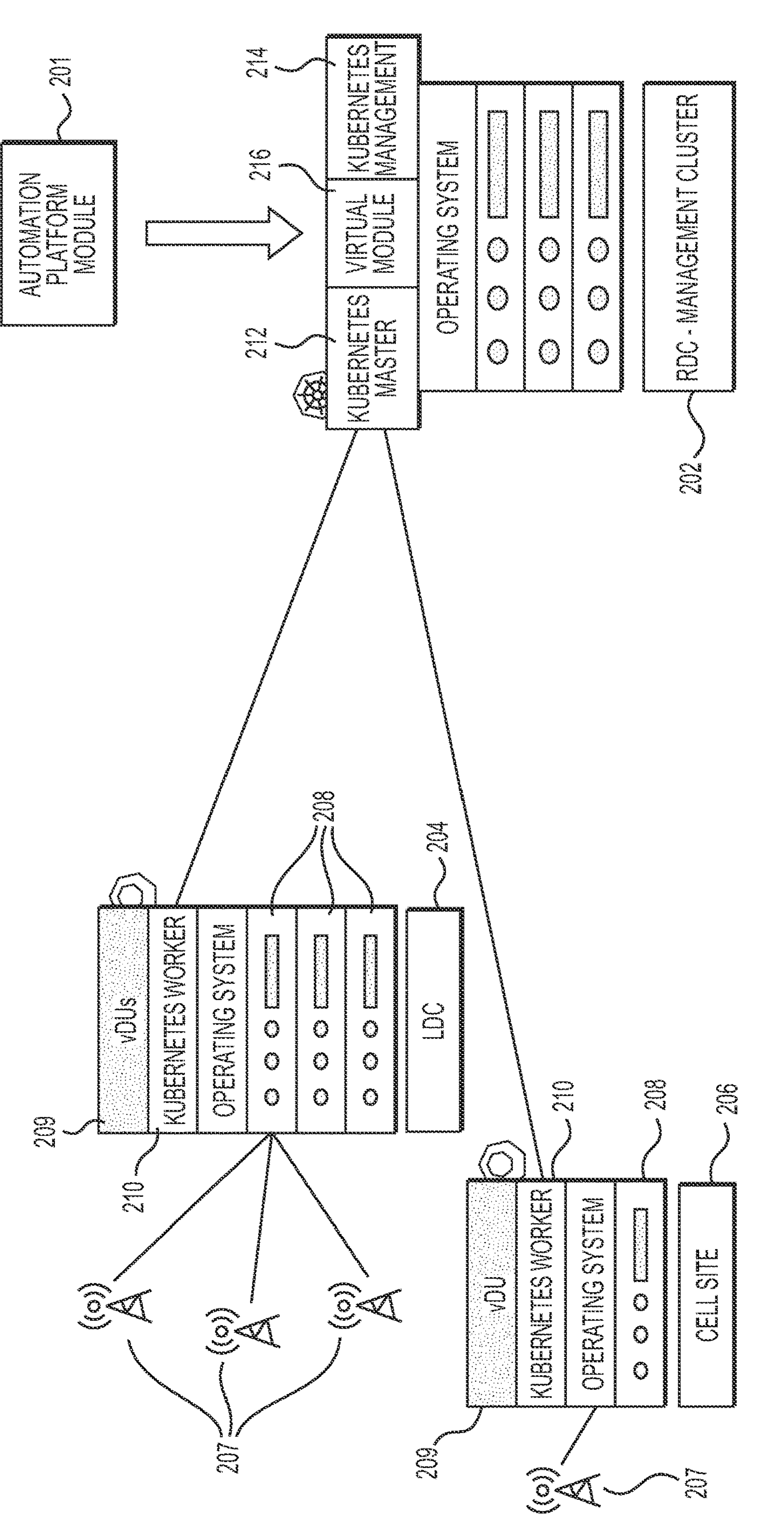
FIG. 2 illustrates an embodiment of a wireless cellular system using a Kubernetes configuration, according to some embodiments.

FIG. 2 illustrates an exemplary system used in constructing clusters that allows a network to control cell sites, in one embodiment of the invention. The system includes a cluster configuration server that can be used by a cell site to provide various containers for processing of various functions. Each of the cell sites are accessed by the client devices, which may be any computing device which has cellular capabilities, such as a mobile phone, computer or other computing device.

As shown, the system includes an automation platform (AP) module 201, a remote data center (RDC) 202, one or more local data centers (LDC), and one or more cell sites (206).

The cell sites provide cellular service to the client devices through the use of a vDU 207, server 208, and a tower 209. The server 208 at a cell site 206 controls the vDU 207 located at the cell site 206, which in turn controls communications from the tower 209. Each vDU is software to control the communications with the towers 207, RRUs, and CU so that communications from client devices can communicate from one tower through the kubernetes clusters to another cellular tower 207. In other words, the voice and data from a cellular mobile client device connects to the towers and then goes through the vDU to transmit such voice and data to another vDU to output such voice and data to another tower 207.

The server(s) on each individual cell site 206 or LDC 204 may not have enough computing power to run a control plane that supports the functions in the mobile telecommunications system to establish and maintain the user plane. As such, the control plane is then run in a location that is remote from the cell cites 206, such as the RDC.

The RDC 202 is the management cluster which manages the LDC 204 and a plurality of cell sites 206. As mentioned above, the control plane may be deployed in the RDC 202. The control plane maintains the logic and workloads in the cell sites from the RDC 202 while each of the kubernetes containers is deployed at the cell sites 206. The control plane also monitors the workloads are running properly and efficiently in the cell sites 206 and fixes any workload failures. If the control plane determines that a workload fails at the cell site 206, for example, the control plane redeploys the workload on the cell site 206.

The RDC 202 may include a kubernetes master 212 (or kubernetes master module), a kubernetes management module 214 and a virtual (or virtualization) module 216. The master module 212 monitors and controls the kubernetes workers 210 and the applications running thereon, such as the vDUs 209. If a vDU 209 fails, the master module 212 recognizes this, and will redeploy the vDU 209 automatically. In this regard, the kubernetes clusters system has intelligence to maintain the configuration, architecture and stability of the applications running. In this regard, the kubernetes clusters system may be considered to be "self-healing".

The management module 214 along with the Automation Platform 201 creates the kubernetes clusters in the LDCs 204 and cell sites 206.

For each of the servers 209 in the LDC 204 and the cell sites 206, an operating system is loaded in order to run the kubernetes workers 210. For example, such software could be ESKi and Photon OS. The vDUs are also software, as mentioned above, that runs on the kubernetes workers 210. In this regard, the software layers are the operating system, and then the kubernetes workers 210, and then the vDUs 209.

The automation platform module 201 includes a GUI that allows a user to initiate kubernetes clusters. The automation platform module 201 communicates with the management module 214 so that the management module 214 creates the kubernetes clusters and a master module 212 for each cluster.

Prior to creating each of the clusters, the virtualization center 216 module creates a virtual machine (VM) so that the kubernetes clusters can be created. VMs and containers are integral parts of the kubernetes infrastructure of data centers and cell sites. VMs are emulations of particular computer systems that operate based on the functions and computer architecture of real or hypothetical computers. A VM is equipped with a full server hardware stack that has been virtualized. Thus, a VM includes virtualized network adapters, virtualized storage, a virtualized CPU, and a virtualized BIOS. Since VMs include a full hardware stack, each VM requires a complete operating system (OS) to function, and VM instantiation thus requires booting a full OS.

In addition to VMs, which provide abstraction at the physical hardware level (e.g., by virtualizing the entire server hardware stack), containers are created on top of the VMs. Containers provide abstraction at the OS level. In most container systems, the user space is also abstracted. A typical example is application presentation systems such as from Citrix applications. Citrix's applications create a segmented user space for each instance of an application. Citrix's applications may be used, for example, to deploy an office suite to dozens or thousands of remote workers. In doing so, Citrix's applications create sandboxed user spaces on a Windows Server for each connected user. While each user shares the same operating system instance including kernel, network connection, and base file system, each instance of the office suite has a separate user space.

In any event, once the VMs and containers are created, the master modules 212 then create a vDU 209 for each VM.

The LDC 204 is a data center that can support multiple servers and multiple towers for cellular communications. The LDC 204 is similar to the cell sites 206 except that each LDC has multiple servers 209 and multiple towers 207. Each server in the LDC 204 (as compared with the server in each cell site 206) may support multiple towers. The server 209 in the LDC may be different from the server 209 in the cell site 206 because the servers 209 in the LDC are larger in memory and processing power (number of cores, etc.) relative to the servers in the individual cell sites 206. In this regard, each server 209 in the LDC may run multiple vDUs (e.g., 2), where each of these vDUs independently operates a cell tower 207. Thus, multiple towers 207 can be operated through the LDCs 204 using multiple vDUs using the kubernetes clusters. The LDCs 204 may be placed in bigger metropolitan areas whereas individual cell sites 206 may be placed at smaller population areas.

Figure 3:
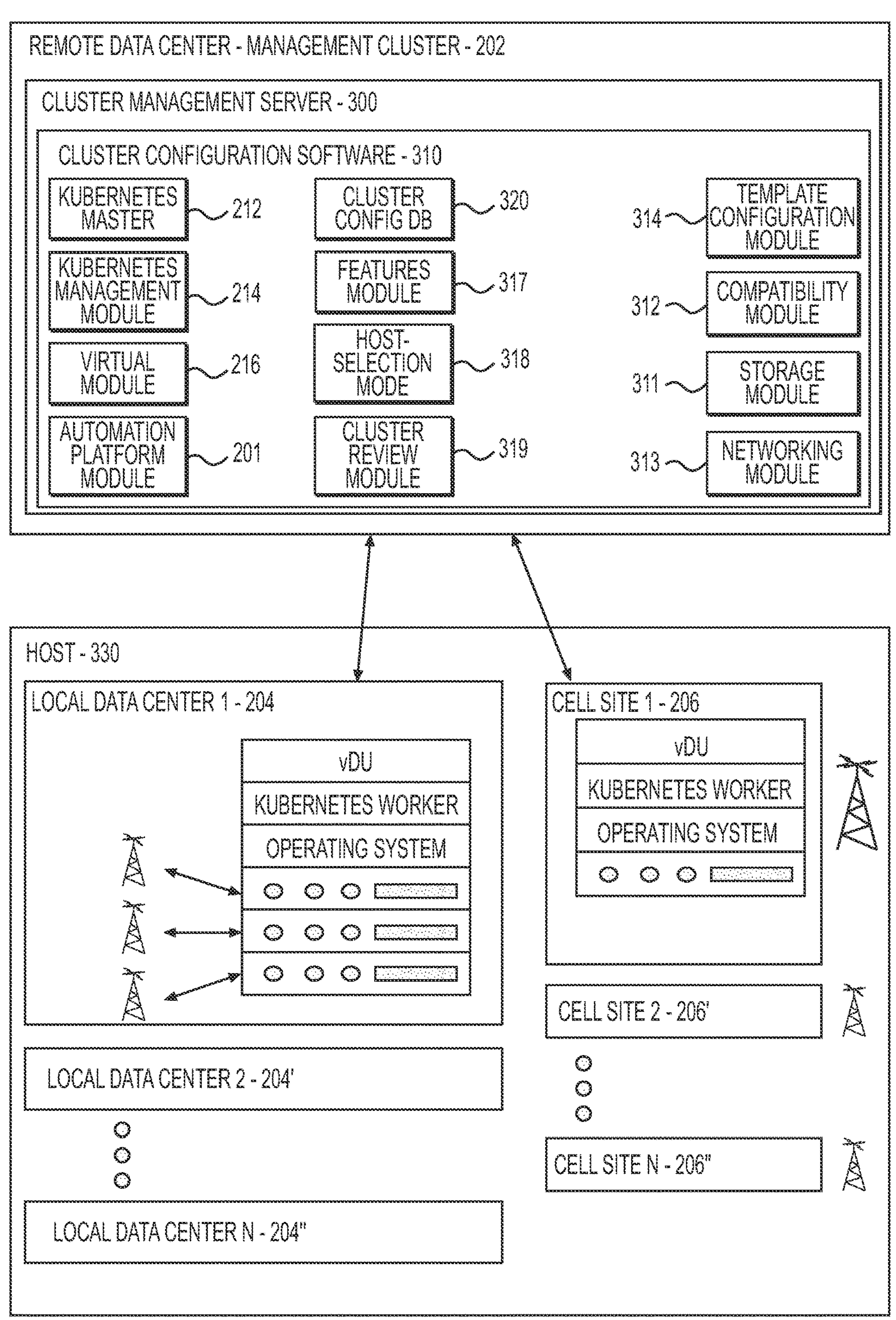
FIG. 3 illustrates a block diagram of the system of FIG. 2 according to some embodiments.

FIG. 3 illustrates a block diagram of the system of FIG. 2 but further illustrating details of cluster configuration software, according to various embodiments.

As illustrated, a cluster management server 300 is configured to run the cluster configuration software 310. The cluster configuration software 310 runs using computing resources of the cluster management server 300. The cluster management server 300 is configured to access a cluster configuration database 320. In one embodiment, the cluster configuration database 320 includes a host list with data related to a plurality of hosts 330 including information associated with hosts, such as host capabilities. For instance, the host data may include list of hosts 330 accessed and managed by the cluster management server 300, and for each host 330, a list of resources defining the respective host's capabilities. Alternately, the host data may include a list of every host in the entire virtual environment and the corresponding resources or may include only the hosts that are currently part of an existing cluster and the corresponding resources. In an alternate embodiment, the host list is maintained on a server that manages the entire virtual environment and is made available to the cluster management server 300.

In addition to the data related to hosts 330, the cluster configuration database 320 includes features list with data related to one or more features including a list of features and information associated with each of the features. The information related to the features include license information corresponding to each feature for which rights have been obtained for the hosts, and a list of requirements associated with each feature. The list of features may include, for example and without limitations, live migration, high availability, fault tolerance, distributed resource scheduling, etc. The list of requirements associated with each feature may include, for example, host name, networking and storage requirements. Information associated with features and hosts are obtained during installation procedure of respective components prior to receiving a request for forming a cluster.

Each host is associated with a local storage and is configured to support the corresponding containers running on the host. Thus, the host data may also include details of containers that are configured to be accessed and managed by each of the hosts 330. The cluster management server 300 is also configured to access one or more shared storage and one or more shared network.

The cluster configuration software 310 includes one or more modules to identify hosts and features and manage host-feature compatibility during cluster configuration. The configuration software 310 includes a compatibility module 312 that retrieves a host list and a features list from the configuration database 320 when a request for cluster construction is received from the client. The compatibility module 312 checks for host-feature compatibility by executing a compatibility analysis which matches the feature requirements in the features list with the hosts capabilities from the host list and determines if sufficient compatibility exists for the hosts in the host list with the advanced features in the features list to enable a cluster to be configured that can utilize the advanced features. Some of the compatibilities that may be matched include hardware, software and licenses.

It should be noted that the aforementioned list of compatibilities are exemplary and should not be construed to be limiting. For instance, for a particular advanced feature, such as fault tolerance, the compatibility module checks whether the hosts provide a compatible processor family, host operating system, Hardware Virtualization enabled in the BIOS, and so forth, and whether appropriate licenses have been obtained for operation of the same. Additionally, the compatibility module 312 checks to determine if networking and storage requirements for each host in the cluster configuration database 320 are compatible for the selected features or whether the networking and storage requirements may be configured to make them compatible for the selected features. In one embodiment, the compatibility module checks for basic network requirements. This might entail verifying each host's connection speed and the subnet to determine if each of the hosts has the required speed connection and access to the right subnet to take advantage of the selected features. The networking and storage requirements are captured in the configuration database 320 during installation of networking and storage devices and are used for checking compatibility.

The compatibility module 312 identifies a set of hosts accessible to the management server 300 that either matches the requirements of the features or provides the best match and constructs a configuration template that defines the cluster configuration settings or profile that each host needs to conform in the configuration database 320. The configuration analysis provides a ranking for each of the identified hosts for the cluster. The analysis also presents a plurality of suggested adjustments to particular hosts so as to make the particular hosts more compatible with the requirements. The compatibility module 312 selects hosts that best match the features for the cluster. The cluster management server 300 uses the configuration settings in the configuration template to configure each of the hosts for the cluster. The configured cluster allows usage of the advanced features during operation and includes hosts that are most compatible with each other and with the selected advanced features.

In addition to the compatibility module 312, the configuration software 310 may include additional modules to aid in the management of the cluster including managing configuration settings within the configuration template, addition/deletion/customization of hosts and to fine-tune an already configured host so as to allow additional advanced features to be used in the cluster. Each of the modules is configured to interact with each other to exchange information during cluster construction. For instance, a template configuration module 314 may be used to construct a configuration template to which each host in a cluster must conform based on specific feature requirements for forming the cluster. The configuration template is forwarded to the compatibility module which uses the template during configuration of the hosts for the cluster. The host configuration template defines cluster settings and includes information related to network settings, storage settings and hardware configuration profile, such as processor type, number of network interface cards (NICs), etc. The cluster settings are determined by the feature requirements and are obtained from the Features list within the configuration database 320.

A configuration display module may be used to return information associated with the cluster configuration to the client for rendering and to provide options for a user to confirm, change or customize any of the presented cluster configuration information. In one embodiment, the cluster configuration information within the configuration template may be grouped in sections. Each section can be accessed to obtain further information regarding cluster configuration contained therein.

A features module 317 may be used for mining features for cluster construction. The features module 317 is configured to provide an interface to enable addition, deletion, and/or customization of one or more features for the cluster. The changes to the features are updated to the features list in the configuration database 320. A host-selection module 318 may be used for mining hosts for cluster configuration. The host-selection module 318 is configured to provide an interface to enable addition, deletion, and/or customization of one or more hosts. The host-selection module 318 is further configured to compare all the available hosts against the feature requirements, rank the hosts based on the level of matching and return the ranked list along with suggested adjustments to a cluster review module 319 for onward transmission to the client for rendering.

The cluster review module 319 may be used to present the user with a proposed configuration returned by the host-selection module 318 for approval or modification. The configuration can be fine-tuned through modifications in appropriate modules during guided configuration set-up which are captured and updated to the host list in either the configuration database 320 or the server. The suggested adjustments may include guided tutorial for particular hosts or particular features. In one embodiment, the ranked list is used in the selection of the most suitable hosts for cluster configuration. For instance, highly ranked hosts or hosts with specific features or hosts that can support specific applications may be selected for cluster configuration. In other embodiments, the hosts are chosen without any consideration for their respective ranks. Hosts can be added or deleted from the current cluster. In one embodiment, after addition or deletion, the hosts are dynamically re-ranked to obtain a new ranked list. The cluster review module 312 provides a tool to analyze various combinations of hosts before selecting the best hosts for the cluster.

A storage module 311 enables selection of storage requirements for the cluster based on the host connectivity and provides an interface for setting up the storage requirements. Shared storage is required in order to take advantage of the advanced features. As a result, one should determine what storage is shared by all hosts in the cluster and use only those storages in the cluster in order to take advantage of the advanced features. The selection options for storage include all the shared storage available to every host in the cluster. The storage interface provides default storage settings based on the host configuration template stored in the configuration database 320 which is, in turn, based on compatibility with prior settings of hosts, networks and advanced features and enables editing of a portion of the default storage settings to take advantage of the advanced features. In one embodiment, if a required storage is available to only a selected number of hosts in the cluster, the storage module will provide necessary user alerts in a user interface with required tutorials on how to go about fixing the storage requirement for the configuration in order to take advantage of the advanced features. The storage module performs edits to the default storage settings based on suggested adjustments. Any updates to the storage settings including a list of selected storage devices available to all hosts of the cluster are stored in the configuration database 320 as primary storage for the cluster during cluster configuration.

A networking module 313 enables selection of network settings that is best suited for the features and provides an interface for setting up the network settings for the cluster. The networking module provides default network settings, including preconfigured virtual switches encompassing several networks, based on the host configuration template stored in the cluster configuration database, enables selecting/editing the default network settings to enter specific network settings that can be applied/transmitted to all hosts, and provides suggested adjustments with guided tutorials for each network options so a user can make informed decisions on the optimal network settings for the cluster to enable usage of the advanced features. The various features and options matching the cluster configuration requirements or selected during network setting configuration are stored in the configuration database and applied to the hosts so that the respective advanced features can be used in the cluster.

FIG. 3 also illustrates cell sites 206 that are configured to be clients of each cluster. Each cell site 206 is shown as includes a cellular tower 207 and a connection to each distributed unit (DU), similar to FIG. 2. Each DU is labeled as a virtualized distributed unit (vDU) 209, similar to FIG. 2, and each vDU runs as virtual network functions (VNFs) within the an open source network functions virtualization (NFV) infrastructure.

Tower and Antenna Configuration Overview

Figure 4:
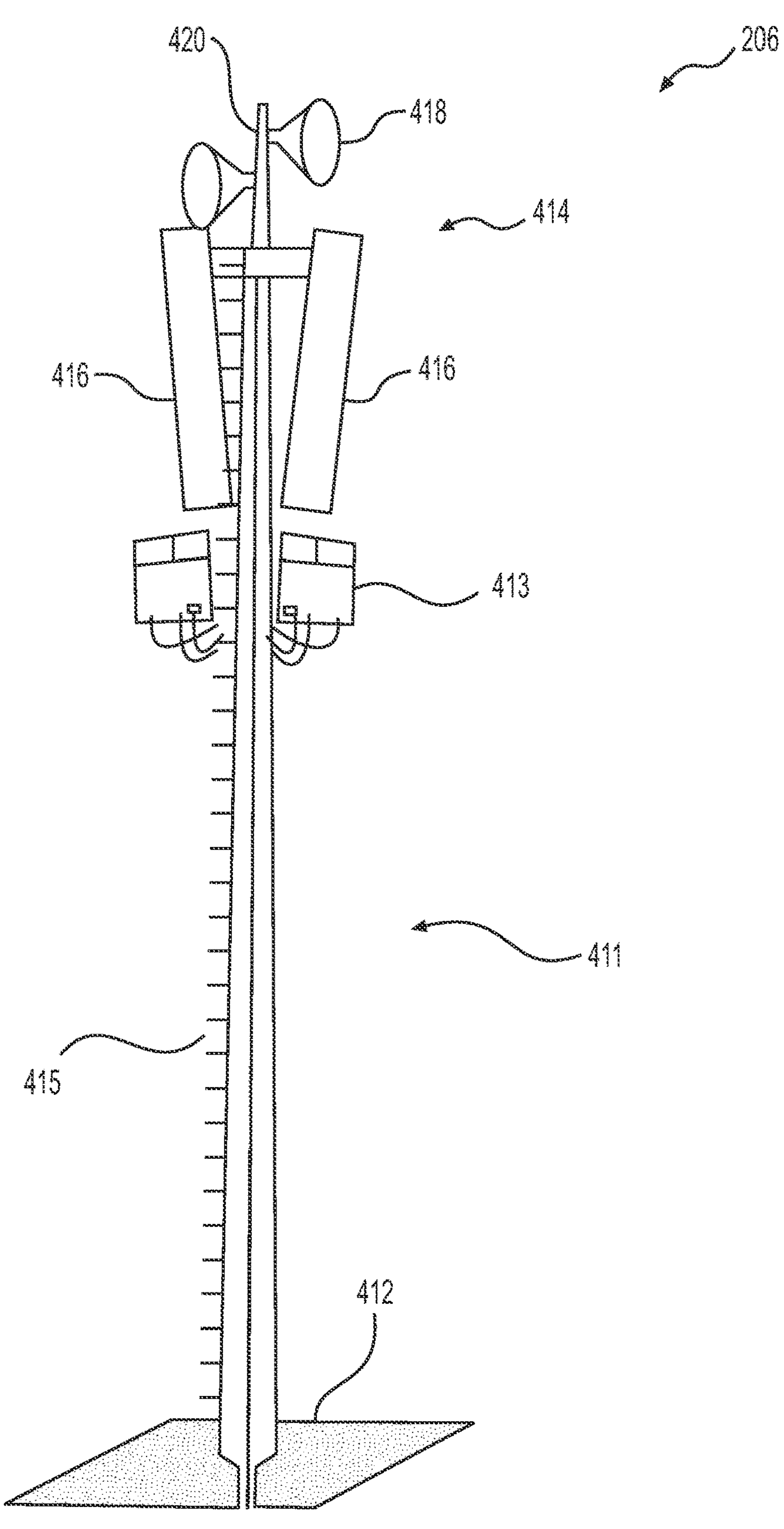
FIG. 4 illustrates a tower of a cell site, according to some embodiments.

Referring now to FIG. 4, in an exemplary embodiment, FIG. 4 illustrates a side view of an exemplary cell site 206. The cell site 206 includes a cell tower 415 in one embodiment. The cell tower 415 can be any type of elevated structure, such as 100-200 feet/30-60 meters tall. Generally, the cell tower 415 is an elevated structure for holding cell site components 414. The cell tower 415 may also include various components; however, there may various components associated with the cell tower 415 and the cell site 206 which are omitted for illustration purposes.

In this exemplary embodiment of FIG. 4, there are four sets 416, 418. 420, 422 of cell site components 414, used for four different wireless service providers, for example. In this example, the sets 416, 418, 420, 422 include various antennas 416 for cellular service. The sets 416, 418. 420, 422 are deployed in sectors and there can be a three sectors for the cell site components-alpha, beta, and gamma. The antennas 416 are used to both transmit a radio signal to a mobile device and receive the signal from the mobile device. The antennas 416 are usually deployed as a single, groups of two, three or even four per sector. The higher the frequency of spectrum supported by the antenna 416, the shorter the antenna 416. The antennas 416 may operate at any frequency for wireless cellular communications, such as around 850 MHz, 1.9 GHz, and the like.

One antenna set may include one or more microwave dishes 418 which can be used to provide other types of wireless connectivity, besides cellular service. There may be other embodiments where the cell tower 415 is omitted and replaced with other types of elevated structures such as roofs, water tanks, etc.

Figure 5:
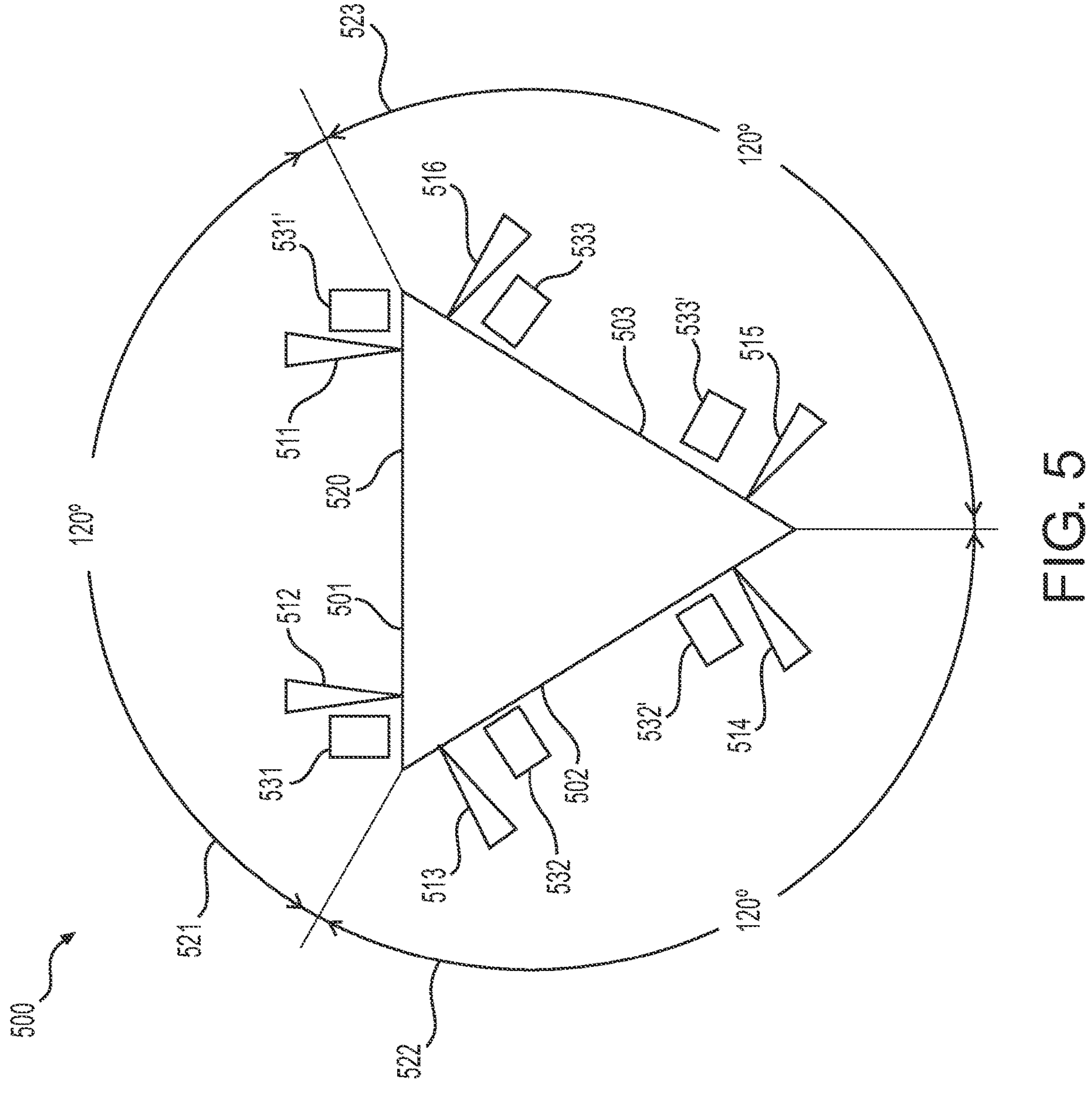
FIG. 5 illustrates a top view of a tower of a cell site, according to some embodiments.

FIG. 5 shows a plan view of an antenna structure 500, which may be similar to antenna set 416 of FIG. 4. The antenna structure 500 generally comprises the triangular platform 520 mounted atop an antenna tower 415 (FIG. 4), or other suitable structure, such as a building (not shown). The platform 520 includes a first side 501, a second side 502, and third side 503.

A main antenna 511 and a diversity antenna 512 spaced apart from the main antenna 510 are mounted on, and generally perpendicular to, the first side 501 of the platform 520 for serving UEs located in a 120° sector 521 of a wireless communication cell, the vertex of which sector is located in the triangular platform, according to some embodiments. Similarly, a main antenna 513 and a diversity antenna 514 spaced apart from the main antenna 513 are mounted on, and generally perpendicular to, the second side 502 of the platform 520 for serving UEs located in a 120° sector 522 of a wireless communication cell, the vertex of which sector is located in the triangular platform, according to some embodiments. Similarly, a main antenna 515 and a diversity antenna 516 spaced apart from the main antenna 515 are mounted on, and generally perpendicular to, the third side 503 of the platform 520 for serving UEs located in a 120° sector 523 of a wireless communication cell, the vertex of which sector is located in the triangular platform.

As mentioned above, each antenna is associated with a corresponding RU. Each of the RUs may be located at the cell site and receives a digital signal(s) from the DUs which can be localized at the location of the RUs or in a central location. The RUs convert the digital signals to analog signals. The RUs then feed the analog signals into the antennas, which then broadcast these analog signals over the air to provide coverage in a specific area. The RUs may operate over specific bands (low bands: 600 Mhz, 700 Mhz, 850 Mhz, mid-bands: 1710 MHz-1780 MHz and 1695 MHz-1710 MHz, etc.).

Each sector of a single cell tower 415 has at least two RUs associated therewith. For example, if there are three sectors, there are six RUs, according to an embodiment. Accordingly, as shown in FIG. 5, sector 521 has RU 531 and RU 531'; sector 522 has RU 532 and RU 532'; and sector 523 has RU 533 and RU 533'. It should be understood that the foregoing antenna structure 500 can have any number of sectors and, hence, the number of UEs, which it can serve is not limited to only three sectors and, there may be any number of sectors (e.g., 6 sectors, 9 sectors, etc.).

These RUs are all operated using software that should be periodically updated, meaning that the software that is used by the RUs needs to be updated so that the RAN may function properly, more effectively, or more efficiently. Conventionally, updating software requires taking the devices controlled thereby to be taken offline, which can cause issues when a device is used all of the time.

In-Service Upgrades of RUs at Cell Sites and Data Centers

As mentioned above, during the software upgrade process of the RU, the RU needs to be rebooted to complete the upgrade and the active sessions/calls are terminated. Hence, the software upgrade of RU impacts service and is typically scheduled during the maintenance window. Below is a discussion of various embodiments of the present application to solve these issues.

As mentioned above, for each sector of an antenna set of a cell tower, there will be two RUs (low band and mid band) and the sectors of the towers provide a 360 degree coverage. For example, as shown in the embodiment of FIG. 5, at a cell site, there may two RUs (low band and mid band) per sector and a typical cell site has three sectors (according to one embodiment). Thus, in this embodiment of FIG. 5, there are six RUs 531, 531', 532, 532', 533, and 533' served by a single DU application. This three sector configuration is to provide 360 degree coverage around the cell site and two RUs per sector are to provide enough capacity in terms of the bandwidth supported.

The below describes the RU architecture and how the in-service software upgrade process for the RU works.

Figure 6:
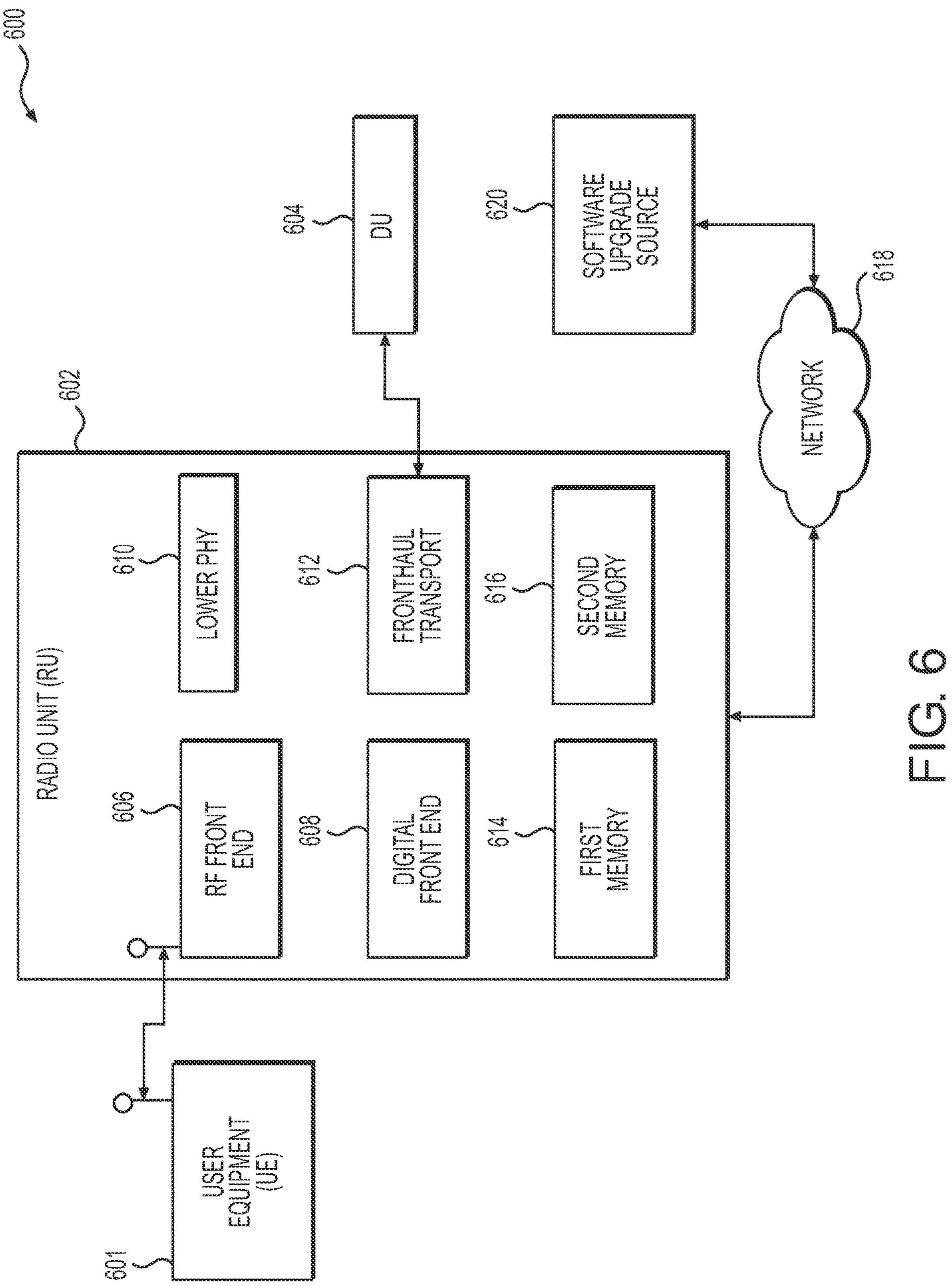
FIG. 6 illustrates a system of an RU, according to some embodiments.

FIG. 6 illustrates a system 600 with how an RU 602 receives and executes the software upgrade. First, the RU 602 may be any of the RUs discussed above including RUs 531, 531', 532, 532', 533, and 533'. Each RU 602 is configured to receive/transmit data to/from UEs 601 via antennas, process this data, and communicate with the DU 604 (whereby the DU 604 then communicates with the CU and the core (as shown in FIG. 1 but not in FIG. 6)).

Each RU 602 may include an RF front end 606, a digital front end 608, a lower physical layer (PHY) 610, a front haul transport 612, a first memory (active memory) 614 and a second memory (standby memory) 616. These components are briefly discussed below.

First, the RF front end 606 is composed of hardware/software (e.g., antenna, bandpass filters, power amplifiers (PA), low noise amplifiers (LNA), digital analog converters (DAC), and analog digital converters (ADC)) to handle communications between the UEs 601 and the RU 602. For example, the antenna physically receives the electromagnetic waves from the UE (and also transmits electromagnetic data to the UE). The band-pass filter receives the electromagnetic waves from the UE antenna and removes the image frequency to prevent strong out-of-band signals from saturating the input stages. The amplifier is used to amplify weak signals without adding noise. The DAC and the ADC are converters to convert the analog signals received from the antenna to digital signals for the RU/RAN to process and conversely, convert the digital signals received from the RU/RAN to analog signals for signals to be sent to the UE antennas.

The digital front end 608 consists of Digital Up Converter (DUC), Digital Down Converter (DDC), Digital Pre-Distortion (DPD) and Crest Factor Reduction (CFR). The digital front-end unit is the interface between the analog front-end and digital baseband modules in the wireless systems. The function of the digital front end (block of digital filters) is to perform gain control, sampling rate conversion, pulse shaping, matched filtering, and phase correction.

The lower PHY 610 layer processing can be implemented by using FPGAs or ASICs. It includes functions of FFT/iFFT, CP addition and Removal, PRACH filtering and digital beamforming. It should be understood that the lower PHY 610 and the higher PHY (not shown) could be a single PHY layer, in one embodiment.

The connectivity between the RU 602 and the DU 604 is the front haul transport 612. This can be done using fiber or Ethernet and standard protocols.

Periodically, the software upgrade source (the vendor, cellular network provider, or other entity) 620 will send a software update to the second memory 616 of the RU 602 over network 618 (e.g., the internet, a direct connection, a LAN, or other network). In this regard, the second memory 616 is the standby memory of the RU 602. The first memory 614 of the RU 602 is active memory and is used to operate active calls to the RU 602 while the second memory 616 is not in use while the first memory 614 is in use. Due to having two separate memories 614 and 616, the RU 602 can install the software upgrade on the second memory 616 while the first memory 614 is being used, and thus, all that needs to be done to complete the upgrade is to send a command to make the second memory 616 active and make the first memory 614 standby and to reboot the RU 602 so these changes go into effect and the new software package to be applied.

In other words, during the upgrade of the first RU of the first sector, the second RU on the same first sector will still be at the previous software version and still carrying user traffic, according to some embodiments.

Figure 7:
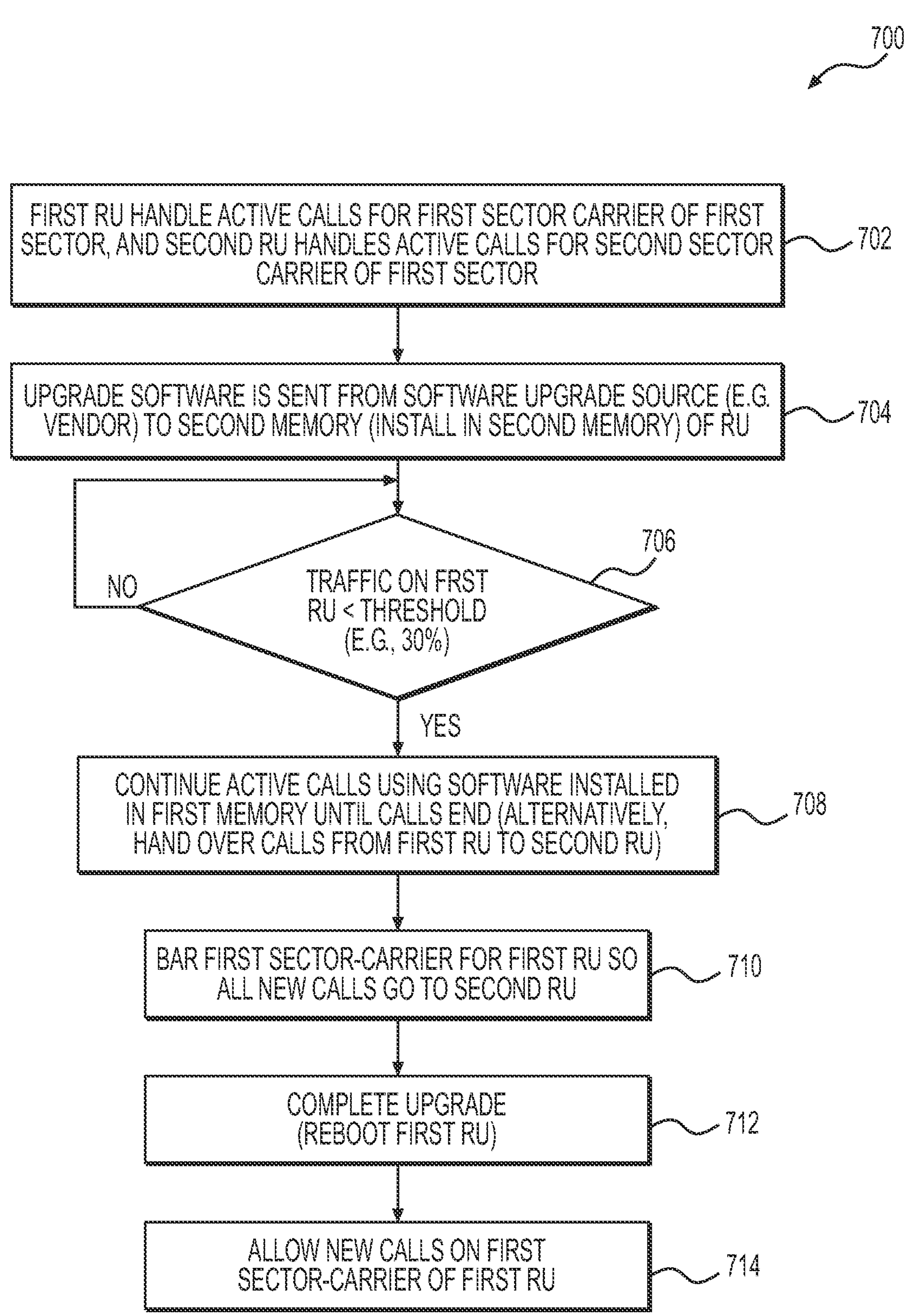
FIGS. 7 and 8 illustrate methods of in-service upgrades of an RAN RU, according to some embodiments.
Figure 8:
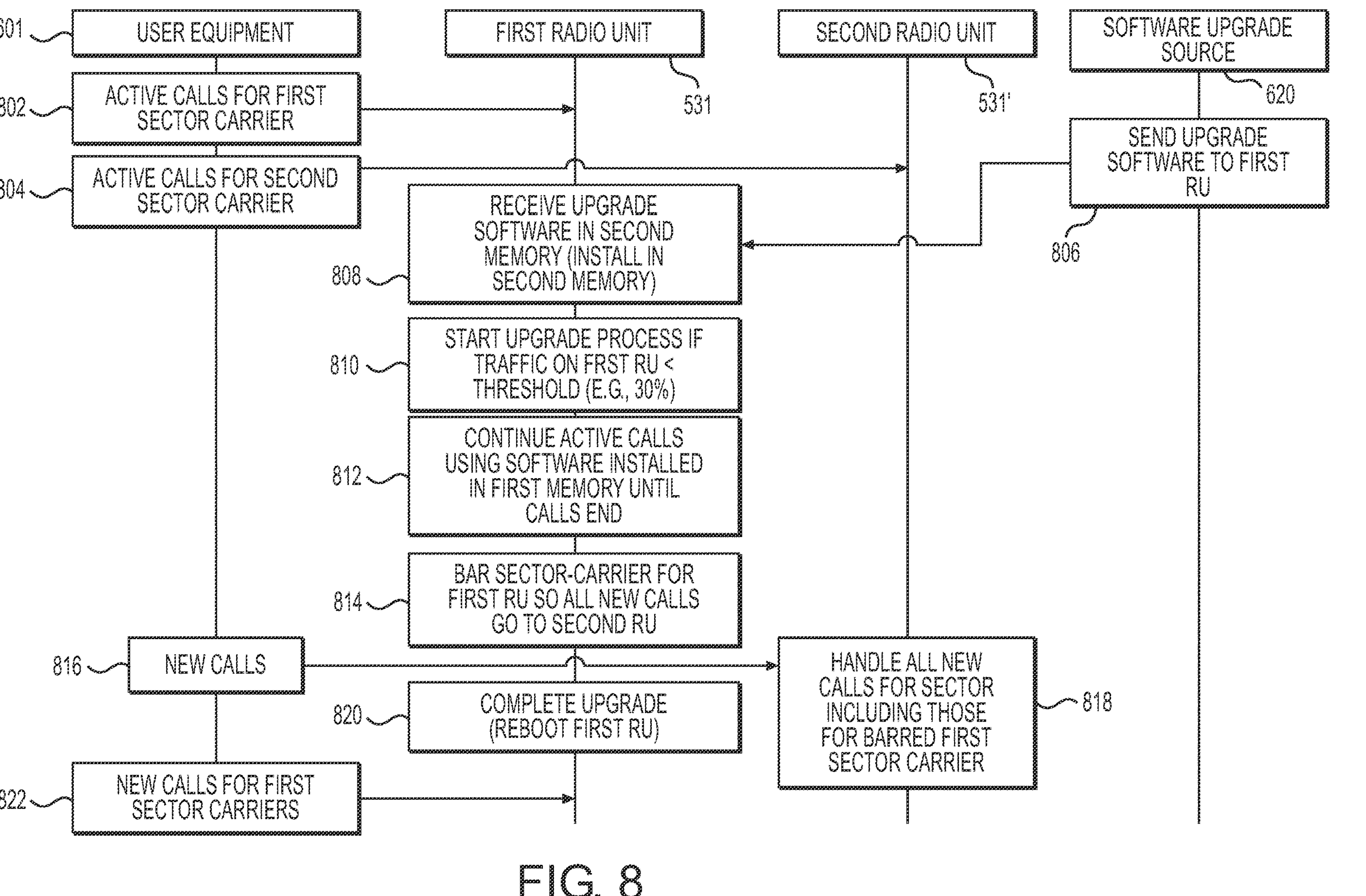

FIGS. 7 and 8 illustrate methods of upgrading the RUs according to various embodiments. For step 702 of the method 700 of FIG. 7, each sector of a cell tower 415 has at least two RUs and each RU handles different sector-carriers. For example, in a first sector of a three sector cell tower, a first RU handles active calls on a first sector-carrier in band 71 while a second RU handles active calls on a second sector-carrier in the same band 71.

In step 704, the upgrade software is sent from the upgrade software source (e.g., a vendor or manufacturer of the RU) 620 to the second or standby memory 616 of the RU 602, as explained above with regard to FIG. 6. The second memory 616 may store and/or install the upgrade software in the second memory 616. At this point, the RU 602 is ready to be rebooted and to run the software in the second memory 616.

During the reboot process, however, active calls are immediately terminated which can negatively impact the end customer experience. Since there are two RUs available per sector to provide 120 degree coverage in the same sector, active calls carried by a first RU of the two sector RUs can be gracefully handed over to the second RU within the same sector to apply the latest software package on the drained first RU. In this regard, for the first RU and second RU in a first sector, the first RU can handle all of the radio traffic for the first sector while the second RU is upgraded, and vice versa. In this regard, whenever there is a new software upgrade available for the RU application, the utilization of all the RUs will be monitored at the cell site to determine when the traffic on the first RU is below a predefined threshold (such as 10%, 20%, 25%, 30%, 35%, or the like), as provided in step 706. In this regard, the software upgrade process will be triggered when the combined traffic utilization on the two RUs on same sector is determined to be below the predefined threshold (such as 10%, 20%, 25%, 30%, 35%, or the like). It is noted that, if the monitored traffic is not below the predefined threshold, the system will continue monitoring the traffic.

When traffic is below the threshold, in step 708, active calls are allowed to continue until completion while barring the first sector-carrier for the first RU so that all new calls that would normally be in the first sector-carrier for the first RU are routed to the second RU. This will drain the first RU from active calls.

Once the predefined threshold is met, sector-carriers served by one of the RUs (first RU) can be barred, as provided in step 710. A sector-carrier is a number of frequency cells in a certain frequency band. For example, the N71 band consists of 35 MHz of contiguous uplink spectrum between 663-698 MHz and includes 35 MHz of downlink spectrum between 617-652 MHz. The band is logically broken down into seven five MHz blocks, which are the sector-carriers (also referred to as band cells).

The term "barring" or "barred" prohibits new calls to be carried by those sector-carriers in a band but the active calls prior to the barring will be permitted to continue until the call is terminated by the UE and thus, the active calls will not be impacted by the barring. The cells that are barred require the UEs camping on these cells to reselect another sector-carrier so that the sector carrier is then not used.

According to one embodiment, once all the active calls on all the sector-carriers on that RU gracefully terminate, this RU can be upgraded to the new software version, as provided in step 712. This may be completed by rebooting the RU.

According to another embodiment, instead of barring the sector-carriers, the calls on the sector-carriers that an RU (first RU) is handling (where the RU needs to be upgraded) can be handed over to the other RU (second RU) in the sector. For example, if a first sector has a first RU and a second RU and the first RU is handling calls in cell A of Band 71 as a low band RU, then the active calls in cell A can be handed over to the second RU in that sector (where the second RU is a mid band RU). Moreover, all future calls (until upgrading the first RU is complete) will be directed to the second RU (by changing the priorities of the cells and bands so that there are other bands/cells with higher priority than the cells for the first RU). Once this occurs for all of the sector-carriers handled by the first RU, the first RU no longer has any traffic and can be rebooted (after the upgrade software has been downloaded and installed for the first RU).

In step 714, once the first RU is upgraded to the latest software version, sector-carriers served by that RU can be non-barred so they can start taking new calls and the same upgrade process can be repeated on the second RU.

FIG. 8 illustrates the method of FIG. 7 but illustrates the entities that may perform the actions, according to various embodiments. As shown, the entities may be UE 601, first RU 531, second RU 531', and a software upgrade source 620 (for upgrading the first RU 531 of a first sector).

In block 802, there are active calls for a first sector carrier. The first RU 531 handles the active calls for the first sector carrier. In block 804, the second RU 531' handles active calls for a second sector carrier. In block 806, the software upgrade is sent to the first RU 531 over network 618, and in block 808, the first RU 531 receives the software upgrade in the second memory (and optionally installs the software in the second memory).

In block 810, the traffic is monitored to determine when the traffic drops below the predetermined threshold (e.g., 30%). If so, then blocks 812 and 814 are executed, where active calls for the first sector-carrier are allowed to continue by the first RU 531, but the first sector-carrier is barred so that no new calls are allowed in the first sector-carrier for the first RU 531. In this regard, the first RU 531 is effectively handing over traffic for the first sector-carrier to the second RU 531', and all new calls (block 816) are routed to the second RU 531'.

Block 818 shows that the second RU 531' handles all of the new calls for the sector for the first and second RUs. At this point, the first RU 531 is drained and the first RU 531 reboots itself, step 820. Once the first RU 531 is upgraded to the latest software version, sector-carriers served by that RU 531 can be non-barred so they can start taking new calls and the same upgrade process can be repeated on the second RU 531', as provided in block 822.

In-Service Upgrades of DUs at Cell Sites and Data Centers

Typically, in a Kubernetes cellular network configuration, a containerized DU (which is a cloud-native network function (CNF)) comprises of a main single Kubernetes pod/micro service which is monolithic and performs Layer 1 (L1) and Layer 2 (L2) data processing for a cell site along with other pods for timing, interface management and OAM.

At a cell site, as mentioned above with regard to FIG. 5, there are two RUs (i.e., a low band RU and a mid band RU) per sector and a typical cell site may have three sectors. Accordingly, there may be six RUs served by the DU application shown in the embodiment of FIG. 5. To achieve in-service upgrades of these DUs, the main data pod needs to be split into two (or more) pods/micro services where both will be active and process L1 and L2 data. By splitting the DU application into two pods, three RUs (low band) will be served by first pod and the remaining three RUs (mid band) will be served by a second pod.

This ensures that if one of the pods fails or is not available because of an upgrade or other reasons, the other pod will still provide service to all the three sectors in a 360 degree orientation but with limited capacity.

Whenever there is a new software upgrade available for the DU application, the policy will be defined to monitor the utilization on both the pods and software upgrade process will be triggered when the combined traffic utilization on both the pods is below a threshold (e.g., 30%). Once the condition or threshold is met, sector-carriers served by one of the pods can be barred. This barring state will prohibit new calls to be carried by those sector-carriers but the active calls will not be impacted. Once all the active calls on all the sector-carriers on that pod gracefully terminate and the pod is fully drained, this pod can be upgraded to the new software version. During the upgrade of the first pod, the second pod will still be at the previous software version and still carrying user traffic.

Once the first pod is upgraded to the new software version, sector-carriers served by that pod can be non-barred so they can start taking new calls and the upgrade can be started on the subsequent pod(s) following the same process described above.

Pods that handle other functionalities can also be upgraded without impacting the service. First, a Precision Time Protocol (PTP) pod can be upgrades. A PTP pod is a method to support synchronization through an IP transport network using the master/slave synchronization paradigm. The protocol primarily organizes the clocks into a master-slave hierarchy based on the Best Master Clock (BMC) algorithm running on each port. The BMC uses a hierarchical selection algorithm based on certain attributes, such as priority, variance, traceability, accuracy, etc., to choose a candidate clock. These attributes are contained within the PTP Announce messages.

In this regard, the PTP pods provide timing and synchronization. The PTP pods need to be in active/standby mode so when the active pod needs to be upgraded, the standby pod can become active and provide timing and synchronization to the DU application. The same upgrade process will be followed for the standby pod.

There are other pods that can be upgraded including fronthaul interface and midhaul interface pods. Fronthaul refers to the network that connects remote radio heads to BBUs many kilometers away, while Midhaul refers to the link between the DU and CU, and finally the Backhaul is representing the link between the CU and the core network.

The fronthaul interface and midhaul interface pods need to be in active/standby mode so when the active pod needs to be upgraded, the standby pod can become active and provide the fronthaul and midhaul connectivity. Same upgrade process will be followed for the standby pod.

Usually Open Application Model (OAM) pods do not impact service and during upgrade of these pods, management interface could be unavailable for short duration.

Although specific embodiments were described herein, the scope of the invention is not limited to those specific embodiments. The scope of the invention is defined by the following claims and any equivalents therein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A method for an in-service upgrading of software for a radio access network (RAN) radio unit (RU), the method comprising:

operating a first RU using software installed in a first memory, wherein the first RU comprises the first memory and a second memory separate from the first memory;

directing traffic from user equipment to the first RU and a second RU that both reside on a first sector of a cell site;

receiving a software upgrade at the second memory of the first RU;

in response to receiving the software upgrade at the second memory of the first RU:

determining a combined traffic utilization on the first RU and the second RU for the first sector of the cell site; and in response to the combined traffic utilization on the first RU and the second RU being less than a predefined threshold:

draining the traffic at the first RU to the second RU; and changing a priority of the first RU and the second RU so that the second RU handles the traffic for the first sector;

upon determining that the traffic has been drained at the first RU:

installing the software upgrade in the second memory of the first RU; and operating the first RU using the upgraded software installed in the second memory.

2. The method of claim 1, wherein operating the first RU comprises:

causing the second memory of the first RU to be active;

causing the first memory of the first RU to be standby; and rebooting the first RU.

3. The method of claim 1, further comprising installing the software upgrade in the second memory while active calls are handled in the first memory.

4. The method of claim 1, wherein the draining comprises:

in response to the combined traffic utilization on the first RU and the second RU being less than the predefined threshold at a first time:

continuing active calls that began prior to the first time; and barring new calls to the first RU after the first time for sector-carriers handled by the first RU.

5. The method of claim 1, wherein the draining comprises:

transferring all traffic from the first RU to the second RU.

6. The method of claim 1, wherein the cell site comprises two RUs per sector so that while the first RU is being upgraded for the first sector, the second RU for the first sector handles all traffic for the first sector.

7. A cell site comprising:

a plurality of antennas;

a plurality of sectors to provide cellular coverage around the cell site; and at least two RUs per sector, where each corresponding RU comprises a first memory having software installed thereon;

a second memory that is independent of the first memory; and a circuit configured to:

operate the corresponding RU using the software installed on the first memory;

handle user equipment traffic in a first sector of the plurality of sectors via an antenna of the plurality of antennas;

receive a software upgrade for upgrading the corresponding RU;

in response to receiving the software upgrade:

determine a combined traffic utilization on the corresponding RU and another RU in the first sector; and in response to the combined traffic utilization on the corresponding RU and the other RU in the first sector being less than a predefined threshold:

drain the traffic from the corresponding RU to the other RU in the first sector; and change a priority of the corresponding RU and the other RU in the first sector so that the other RU handles the traffic for the first sector;

in response to the traffic being drained from the corresponding RU:

install the software upgrade on the second memory of the corresponding RU; and operate the corresponding RU using the upgraded software installed on the second memory.

8. The cell site of claim 7, wherein the circuit is further configured to:

cause the second memory of the corresponding RU to be active;

cause the first memory of the corresponding RU to be standby; and reboot the corresponding RU after the traffic has been drained from the corresponding RU.

9. The cell site of claim 7, wherein draining the traffic from the corresponding RU to another RU comprises:

in response to the combined traffic utilization on the corresponding RU and the other RU in the first sector being less than the predefined threshold at a first time:

continuing active calls that began prior to the first time; and barring new calls to the corresponding RU after the first time for sector-carriers handled by the corresponding RU.

10. A method for an in-service upgrading of software for a radio access network (RAN) radio unit (RU), the method comprising:

directing first traffic from user equipment to a first RU and a second RU that both reside on a first sector of a cell site, wherein the first RU is operating using software installed in a first memory that is separate from a second memory;

receiving a software upgrade for the first RU;

in response to receiving the software upgrade for the first RU:

determining a combined traffic utilization on the first RU and the second RU for the first sector of the cell site; and in response to the combined traffic utilization on the first RU and the second RU being less than a predefined threshold:

draining the first traffic at the first RU to the second RU; and changing a priority of the first RU and the second RU so that the second RU handles the traffic for the first sector;

upon determining that the first traffic has been drained at the first RU:

installing the software upgrade in the second memory of the first RU; and in response to completion of the installing of the software upgrade in the second memory of the first RU, directing second traffic from user equipment to the first RU and the second RU, wherein the first RU is operating using the upgraded software installed in the second memory.

11. The method of claim 10, further comprises rebooting the first RU after no traffic is handled by the first RU and the software upgrade has been installed in the second memory of the first RU.

12. The method of claim 10, further comprising:

in response to the combined traffic utilization on the first RU and the second RU being less than the predefined threshold at a first time:

continuing active calls that began prior to the first time; and barring new calls to the first RU after the first time for sector-carriers handled by the first RU.

* * * * *